(12) United States Patent
Kitamura et al.

(10) Patent No.: US 10,752,384 B2
(45) Date of Patent: Aug. 25, 2020

(54) ORBIT CONTROL DEVICE AND SATELLITE

(71) Applicant: Mitsubishi Electric Corporation, Chiyoda-ku (JP)

(72) Inventors: Kenji Kitamura, Chiyoda-ku (JP); Katsuhiko Yamada, Chiyoda-ku (JP); Takeya Shima, Chiyoda-ku (JP); Hiroshi Suenobu, Nagoya (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 531 days.

(21) Appl. No.: 15/540,726

(22) PCT Filed: Jan. 6, 2016

(86) PCT No.: PCT/JP2016/050262
§ 371 (c)(1),
(2) Date: Jun. 29, 2017

(87) PCT Pub. No.: WO2016/111317
PCT Pub. Date: Jul. 14, 2016

(65) Prior Publication Data
US 2017/0369192 A1    Dec. 28, 2017

(30) Foreign Application Priority Data

Jan. 9, 2015   (JP) ................. 2015-002864

(51) Int. Cl.
*B64G 1/24*       (2006.01)
*B64G 1/26*       (2006.01)
*G05D 1/08*       (2006.01)

(52) U.S. Cl.
CPC ............. *B64G 1/242* (2013.01); *B64G 1/244* (2019.05); *B64G 1/26* (2013.01); *G05D 1/08* (2013.01); *B64G 2001/245* (2013.01)

(58) Field of Classification Search
CPC .... B64G 1/242; B64G 1/26; B64G 2001/245; G05D 1/08; G05D 1/0883
See application file for complete search history.

(56) References Cited

U.S. PATENT DOCUMENTS 3,907,226 A * 9/1975 Neufeld .................... B64G 1/26
                                                    244/169
4,958,788 A * 9/1990 Namera .................. B64G 1/244
                                                    244/169

(Continued)

FOREIGN PATENT DOCUMENTS

| JP | 03-159898 A | 7/1991 |
| JP | 04-349098 A | 12/1992 |
| JP | 2002-046699 A | 2/2002 |

OTHER PUBLICATIONS

Losa, Damiana, et al., "Electric Station Keeping of Geostationary Satellites: a Differential Inclusion Approach", Proceedings of the 44th IEEE Conference on Devision and Control, and the European Control Conference 2005, p. 7484-7489.

(Continued)

*Primary Examiner* — Philip J Bonzell
*Assistant Examiner* — Tye William Abell
(74) *Attorney, Agent, or Firm* — Oblon, McClelland, Maier & Neustadt, L.L.P.

(57) ABSTRACT

A satellite comprises thrusters disposed with the firing directions each facing away from the mass center of satellite and different from each other. A control amount calculator calculates control amounts of the mean orbital elements from the mean orbital elements and the temporal change rates of the mean orbital elements set by an orbit determiner, and the target values. A distributor calculates firing timings and firing amounts of the thrusters for realizing the control amounts of the mean orbital elements by expressing a motion of satellite with orbital elements, solving an equation (Continued)

taking into account coupling of an out-of-plane motion and an in-plane motion due to thruster disposition angles and thruster firing amounts at multiple times, and combining one or more thruster firings controlling mainly an out-of-the-orbit-plane direction and one or more thruster firings controlling mainly an in-the-orbit-plane direction.

17 Claims, 8 Drawing Sheets

(56) References Cited

U.S. PATENT DOCUMENTS

| | | | | |
|---|---|---|---|---|
| 5,124,925 A * | 6/1992 | Gamble | ............... | B64G 1/24 701/531 |
| 5,443,231 A * | 8/1995 | Anzel | ............... | B64G 1/26 244/164 |
| 5,810,295 A * | 9/1998 | Anzel | ............... | B64G 1/242 244/158.6 |
| 5,813,633 A * | 9/1998 | Anzel | ............... | B64G 1/26 244/169 |
| 6,135,394 A * | 10/2000 | Kamel | ............... | B64G 1/242 244/158.8 |
| 6,439,507 B1 * | 8/2002 | Reckdahl | ............... | B64G 1/242 244/158.8 |
| 2009/0020650 A1 | 1/2009 | Ho | | |
| 2011/0144835 A1 * | 6/2011 | Ho | ............... | B64G 1/242 701/13 |

OTHER PUBLICATIONS

Walker M.J.H., et al., "*A set of modified equinoctial orbit elements*", Celestial Mechanics 1985, 36(4): p. 409-419.

International Search Report dated Apr. 5, 2016 in PCT/JP2016/050262, filed Jan. 6, 2016.

Extended European Search Report dated Aug. 30, 2018 in European Patent Application No. 16735056.0, 8 pages.

* cited by examiner

ORBIT CONTROL DEVICE AND SATELLITE

TECHNICAL FIELD

The present disclosure relates to an orbit control device for keeping the orbit of a satellite and a satellite mounted with the orbit control device.

BACKGROUND ART

Satellites or spacecraft flying in circular orbit at approximately 36,000 km above the equator seem to be almost stationary to ground observers because their period of orbital motion and the rotation period of the earth are nearly equal. Such satellites are called geostationary satellites. However, in fact, the geostationary satellites are subject to various perturbative forces such as tidal force from the earth and the sun, perturbative force due to non-uniform gravity potentials of the earth, and solar radiation pressure; consequently, their latitude and longitude gradually change. Therefore, the satellites have to fire the thrusters for correcting change in the latitude and longitude. The thruster firing for correcting change in the longitude is generally called east-west control and the control for correcting change in the latitude is generally called south-north control. Performing the east-west control and the south-north control to keep the longitude and the latitude of a satellite in desired ranges is generally called orbital station-keeping.

A technique for realizing the orbital station-keeping of a geostationary satellite is described in, for example, Non-Patent Literature 1. The technique in the Non-Patent Literature 1 performs orbital station-keeping control on a geostationary satellite where electric propulsion devices are disposed in a petal-like pattern using a nonlinear optimum control technique. The Non-Patent Literature 1 fires four thrusters simultaneously and has an orbital station-keeping accuracy of approximately 0.005 degrees.

CITATION LIST

Non-Patent Literature

Non-Patent Literature 1: D. Losa, et al., "Electric Station Keeping of Geostationary Satellites: a Differential Inclusion Approach," 2005.

SUMMARY OF INVENTION

Technical Problem

However, the example known art technique presented in the Non-Patent Literature 1 calculates the firing amounts of the electric propulsion devices using a nonlinear programming method for realizing highly accurate orbital station-keeping with low propellant consumption. Therefore, high calculation cost is required and this example technique is not suitable for calculating the firing rules.

An objective of the present disclosure is to calculate the thruster firing rules for performing highly accurate orbital station-keeping while suppressing the propellant consumption with low calculation cost.

Solution to Problem

The orbit control device according to the present disclosure is an orbit control device for a satellite providing four thrusters disposed on the satellite with firing directions each facing away from a mass center of the satellite and different from each other, including an orbit determiner to determine mean orbital elements of the satellite and temporal change rates of the mean orbital elements; a target value setter to set target values of the mean orbital elements; a control amount calculator to calculate control amounts of the mean orbital elements from the mean orbital elements, the temporal change rates of the mean orbital elements, and the target values; a distributor to calculate firing timings and firing amounts of the thrusters for realizing the control amounts of the mean orbital elements calculated by the control amount calculator by expressing a motion of the satellite with orbital elements, solving an equation taking into account coupling of an out-of-the-orbit-plane motion and an in-the-orbit-plane motion due to thruster disposition angles and thruster firing amounts at multiple times, and combining one or more thruster firings controlling mainly an out-of-the orbit-plane direction and one or more thruster firings controlling mainly an in-the-orbit-plane direction; and a thruster controller to control the thrusters based on the firing timings and the firing amounts calculated by the distributor.

Advantageous Effects of Invention

The present disclosure enables calculation of the thruster firing rules suppressing the propellant consumption with low calculation cost.

DESCRIPTION OF EMBODIMENTS

Conventionally, multiple electric propulsion thrusters are simultaneously fired for realizing highly accurate orbital station-keeping. The electric propulsion thrusters consume high electric power and consequently, firing multiple thrusters simultaneously significantly constrains actual operations. Moreover, in the given example of the known technique, the firing amounts of the electric propulsion devices are determined using nonlinear optimization calculation for realizing highly accurate orbital station-keeping. Consequently, high calculation cost is required, and hence the technique is not suitable for calculating the firing amounts with use of satellite on-board computers. The present disclosure provides an orbit control device and a satellite keeping the orbit of the satellite with high accuracy while suppressing the power consumption or the amount of propellant.

Embodiment 1

Figure 1:
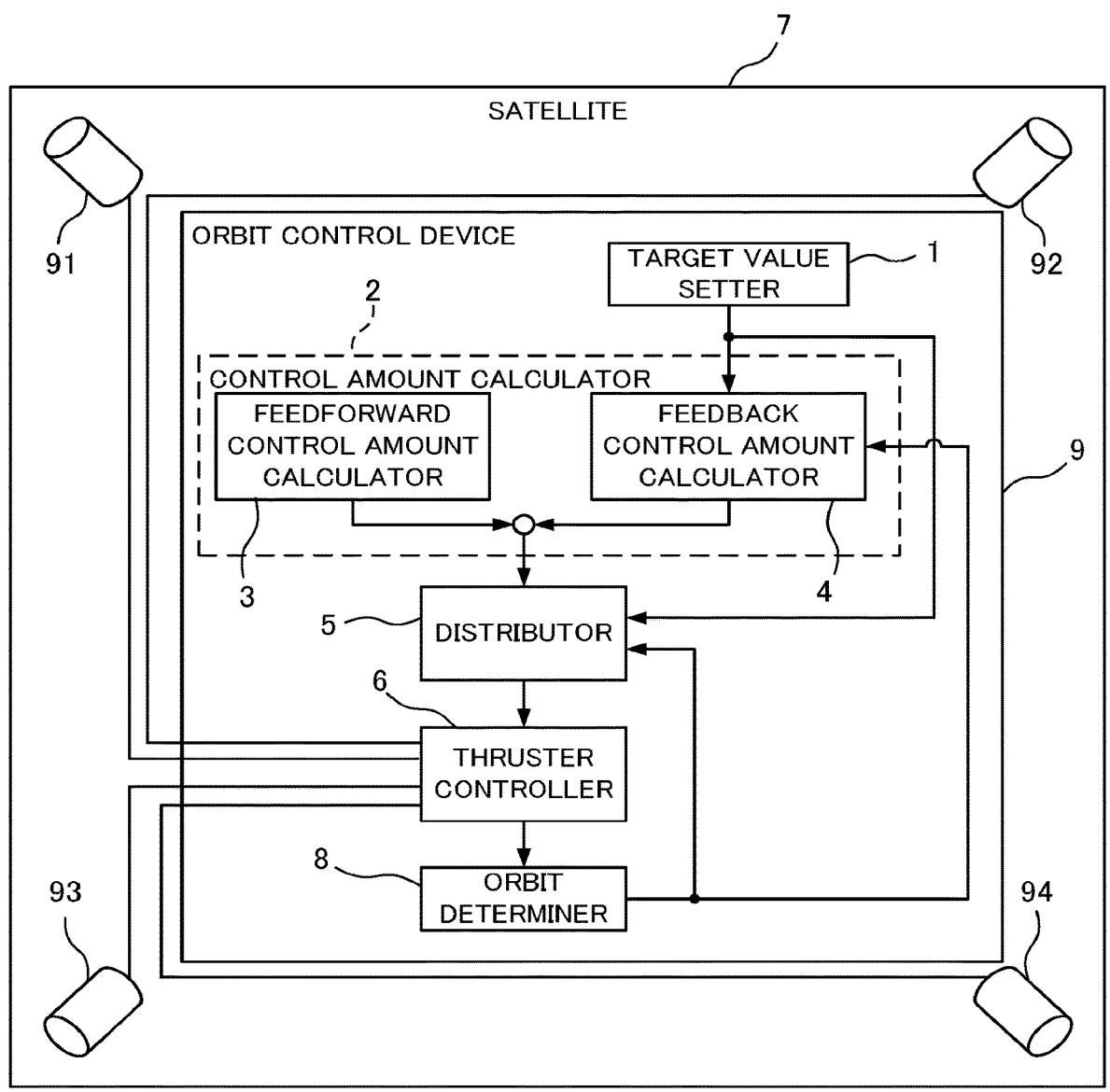
FIG. 1 is a block diagram illustrating a configuration of a satellite orbit control device according to Embodiment 1 of the present disclosure.

FIG. 1 is a block diagram illustrating a configuration of a satellite orbit control device according to Embodiment 1 of the present disclosure. An orbit control device 9 is mounted on a satellite 7. In embodiments, the satellite 7 is assumed to be a geostationary satellite. The satellite 7 includes four thrusters 91, 92, 93, and 94 and the orbit control device 9 controlling them. The orbit control device 9 includes a target value setter 1, a control amount calculator 2, a distributor 5, an orbit determiner 8, and a thruster controller 6. The control amount calculator 2 includes a feedforward control amount calculator 3 and a feedback control amount calculator 4. The orbit control device 9 determines a firing timing and a firing amount of each of the thrusters 91, 92, 93, and 94 for keeping the orbit of the satellite 7 and controls the thrusters 91, 92, 93, and 94 to fire with the determined firing timings and firing amounts.

In the orbit control device 9 of Embodiment 1, the orbit determiner 8 determines mean orbital elements of the satellite 7 and temporal change rates of the mean orbital elements from, for example, GPS information, information on the range and range rate of the satellite with respect to a ground station, and information on the azimuth/elevation angle of the satellite obtained by observation with an optical camera on the ground. Here, the mean orbital elements are average orbital elements obtained by eliminating periodically changing components from the satellite orbital elements. The target value setter 1 sets target values of the mean orbital elements that are proper for realizing orbital station-keeping of the satellite 7. The target values of the mean orbital elements include target values of the mean ground longitude, the mean eccentricity vector, the mean inclination vector, and the like. The control amount calculator 2 calculates feedforward control amounts and feedback control amounts of the mean eccentricity vector and the mean inclination vector of the satellite 7 based on the mean orbital elements and the temporal change rates of the mean orbital elements calculated by the orbit determiner 8 and the target values of the mean orbital elements set by the target value setter 1. The distributor 5 receives the control amount of the mean inclination vector calculated by the control amount calculator 2, the target value of the mean ground longitude set by the target value setter 1, and the mean orbital elements and the temporal change rates of the mean orbital elements calculated by the orbit determiner 8, and calculates the control amounts of the mean eccentricity vector and the mean inclination vector and the control amount of the mean ground longitude for maintaining the mean ground longitude in the vicinity of a target value. Then, firing timings and firing amounts of the thrusters for realizing the calculated control amounts are calculated. The thruster controller 6 makes the thrusters 91, 92, 93, and 94 fire based on the firing timings and the firing amounts calculated by the distributor 5.

Figure 2:
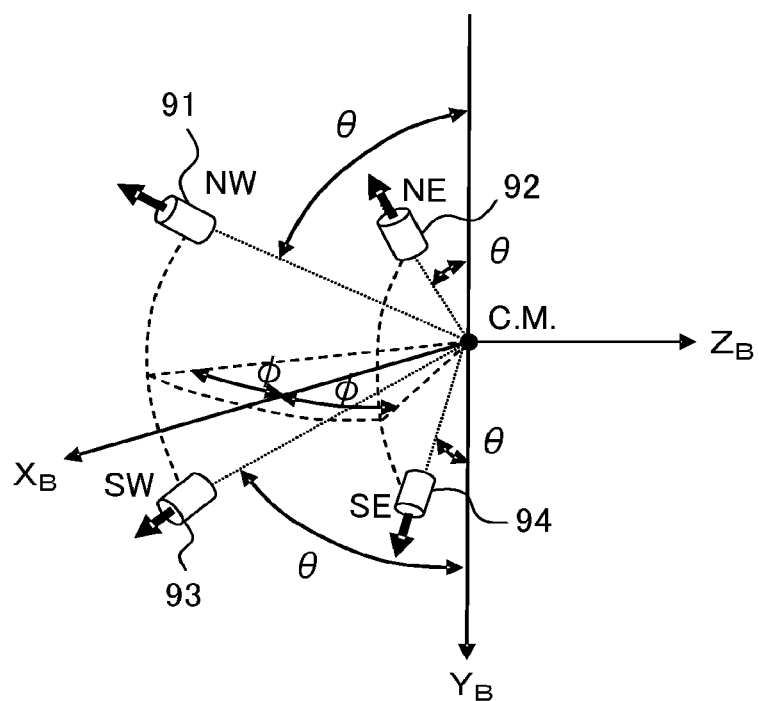
FIG. 2 is an illustration illustrating a disposition of thrusters.

The four thrusters 91, 92, 93, and 94 are disposed in a petal-like pattern on the satellite 7 surface facing away from the earth. In other words, the thrusters 91, 92, 93, and 94 are disposed with the firing directions each facing away from the central celestial body (the earth) when seen from the mass center of the satellite 7 and different from each other on a line passing through the mass center of the satellite 7. FIG. 2 illustrates a disposition of the thrusters. In FIG. 2, the letters C. M. (center of mass) present the mass center of the satellite 7. In FIG. 2, the $X_B$ axis coincides with the direction from the center of a central celestial body, typically the earth, to the satellite's mass center C. M., the $Z_B$ axis coincides with the velocity direction of the satellite, and the $Y_B$ axis constitutes the right-handed coordinate system with respect to the $X_B$ axis and the $Z_B$ axis. In FIG. 2, the firing directions of the thrusters 91, 92, 93, and 94 are northwest, northeast, southwest, and southeast, respectively. The thrusters 91, 92, 93, and 94 are also called the NW thruster, the NE thruster, the SW thruster, and the SE thruster, respectively. In FIG. 2, the angles θ are the angles between the thrusters 91, 92, 93, and 94 and the $Y_B$ axis. The angles φ are the angles between the line segments connecting each of the thrusters 91, 92, 93, and 94 and the mass center of the satellite 7 and projected on the $X_B Z_B$ plane and the $X_B$ axis.

Figure 7:
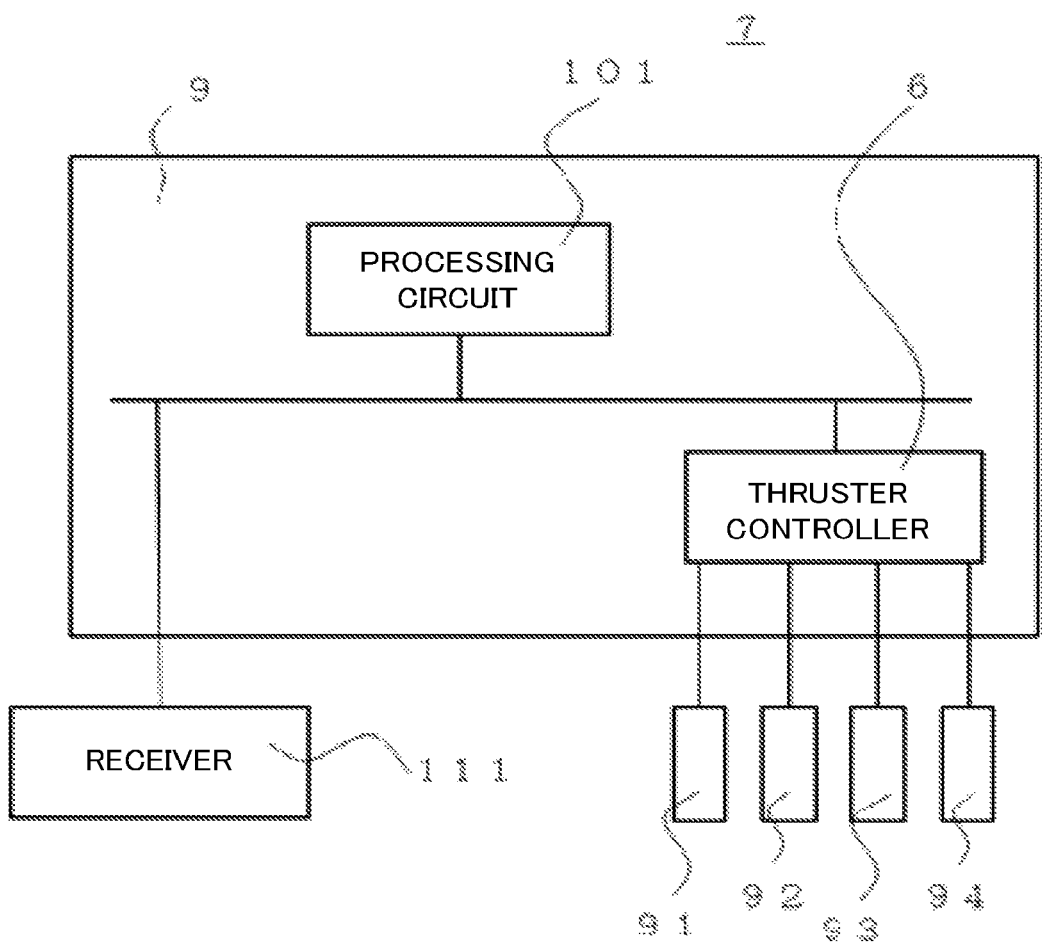
FIG. 7 is a diagram illustrating an example hardware configuration of the present disclosure.

The hardware configuration of this embodiment is described next. FIG. 7 is a diagram illustrating an example hardware configuration. As illustrated in the figure, the satellite 7 includes a receiver 111 receiving GPS signals and range and range rate signals, the orbit control device 9 receiving the signals from the receiver 111, determining an orbit, and then controlling the thrusters, and the control-target thrusters 91, 92, 93, and 94. Moreover, the orbit control device 9 includes a processing circuit 101 realizing the functions of the target value setter 1, the control amount calculator 2, the distributor 5, and the orbit determiner 8, and a thruster controller 6 controlling the thrusters based on the calculation results of the distributor 5. The processing circuit may be a dedicated piece of hardware, or a central processing unit (also called a CPU, a central processing device, a processing device, an arithmetic device, a microprocessor, a microcomputer, a processor, or a DSP) executing programs saved in a memory.

Figure 8:
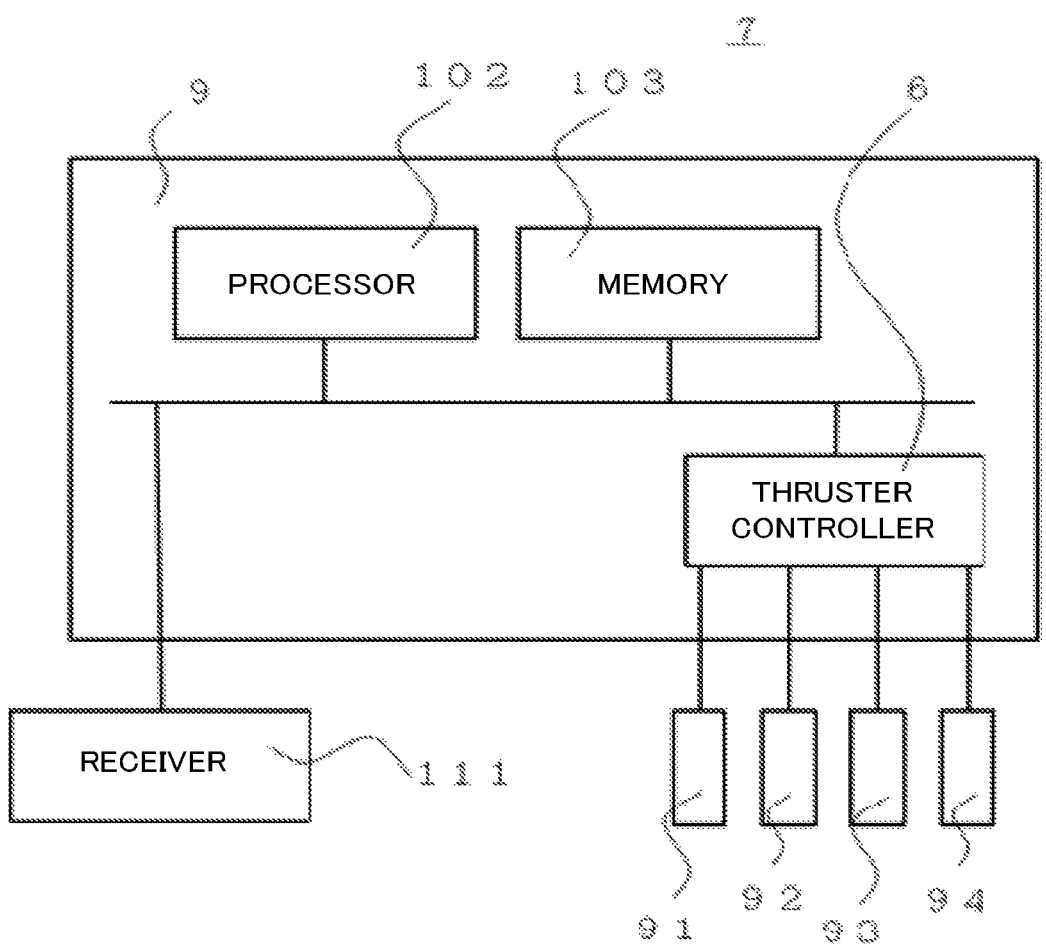
FIG. 8 is a diagram illustrating an example hardware configuration of the present disclosure.

Moreover, FIG. 8 is a diagram illustrating another example hardware configuration of this embodiment. As illustrated in the figure, the satellite 7 may include the receiver 111 receiving GPS signals and range and range rate signals, the orbit control device 9 receiving the signals from the receiver 111, determining an orbit, and then controlling the thrusters, and the thrusters 91, 92, 93, and 94 subject to control. The processing circuit 101 in FIG. 7 corresponds to a processor (CPU) 102 and a memory 103.

When the processing circuit 101 is a dedicated piece of hardware, the processing circuit 101 is, for example, a single circuit, a complex circuit, a programmed processor, a parallel-programmed processor, an ASIC, an FPGA, or any combination of these. The functions of the target value setter 1, the control amount calculator 2, the distributor 5, and the orbit determiner 8 may be realized each by an individual processing circuit or may be realized collectively by a processing circuit.

When the processing circuit is the processor (CPU) 102, the functions of the target value setter 1, the control amount calculator 2, the distributor 5, and the orbit determiner 8 are realized by software, firmware, or a combination of software and firmware. The software and firmware are written as programs and saved in a memory. The processing circuit reads and executes the programs stored in the memory to realize the functions of the parts. In other words, the orbit control device 9 includes a memory for saving the programs that, when executed by the processing circuit 101, result in executing a target setting step, a control amount calculation step, and a distribution step. Moreover, programs can be said to be those allowing a computer to execute the procedures or the methods of the target value setter 1, the control amount calculator 2, the distributor 5, and the orbit determiner 8. Here, for example, a nonvolatile or volatile semiconductor memory such as a RAM, a ROM, a flash memory, an EPROM, and an EEPROM, a magnetic disc, a flexible disc, an optical disc, a compact disc, a minidisc, a DVD, and the like correspond to the memory.

The memory stores, besides the above programs, the mean orbital elements and the temporal change rates of the mean orbital elements determined by the orbit determiner 8, the target values of the mean orbital elements set by the target value setter 1, the feedforward control amounts and the feedback control amounts of the mean orbital elements calculated by the control amount calculator 2, and the firing amount and the firing timing of each thruster calculated by the distributor 5. The above information stored in the memory is read and used in the processing as appropriate and corrected.

Here, some of the functions of the target value setter 1, the control amount calculator 2, the distributor 5, and the orbit determiner 8 can be realized with dedicated piece of hardware and some with software or firmware. For example, the function of the orbit determiner 8 can be realized with a processing circuit as a dedicated piece of hardware and the function of the distributor 5 can be realized by the processing circuit reading and executing a program saved in the memory. Here, in the above description, in FIG. 8, the processing circuit 101 corresponds to the processor 102 in FIG. 8 and the memory corresponds to the memory 103 in FIG. 8.

As described above, the processing circuit can realize the above-described functions with hardware, software, firmware, or a combination of these. Operations of the parts of the orbit control device 9 are described below.

The target value setter 1 sets target values of the mean orbital elements of the satellite 7. The mean orbital elements include, for example, the mean mean ground longitude $\Lambda_M$, the mean mean ground longitude angular velocity $\Lambda'_M$, the mean mean ground longitude angular acceleration $\Lambda''_M$, the mean eccentricity vector $e_x$, $e_y$, and the mean inclination vector $i_x$, $i_y$. Here, the mean ground longitude $\lambda_M$ is defined by $\lambda_M = \omega + \Omega + M - \theta_g$ in which $\Omega$ is the right ascension of the ascending node of the satellite, $\omega$ is the argument of perigee, M is the mean anomaly, and $\theta_g$ is the argument of Greenwich latitude. The mean mean ground longitude $\Lambda_M$ is the time average of the mean ground longitude $\lambda_M$. Here, needless to say, other parameters may be used as the mean orbital elements. The target values of the mean eccentricity vector of the satellite 7 are denoted by $e_{xref}$, $e_{yref}$; the target values of the mean inclination vector, by $i_{xref}$, $i_{yref}$; and the target value of the mean mean ground longitude, by $\Lambda_{Mref}$. Here, the angles are in [rad] unless otherwise stated.

The target values $e_{xref}$ and $e_{yref}$ of the mean eccentricity vector are set to, for example, $e_{xref}=0$ and $e_{yref}=0$. In another setting, the characteristic in which the eccentricity vector creates a circular locus of $e_n$ in radius in one year under the influence of the solar radiation pressure can be used. Here, the magnitude of the radius $e_n$ is determined by the mass and effective cross-sectional area of the satellite 7 and the optical constant of the satellite surface. When the magnitude of the radius $e_n$ is acceptable as the eccentricity, the target values $e_{xref}$ and $e_{yref}$ of the mean eccentricity vector along a circle of $e_n$ in radius having the center at the origin, whereby the control amount of the mean eccentricity vector by the control amount calculator 2 can be suppressed, are settable. The target values $i_{xref}$ and $i_{yref}$ of the mean inclination vector are set to, for example, $i_{yref}=0$ and $i_{yref}=0$. Moreover, the target value $\Lambda_{Mref}$ of the mean mean ground longitude is set to, for example, $\Lambda_{Mref}=140$ deg. in the case of keeping the satellite 7 above Japan.

The control amount calculator 2 calculates the control amounts of the mean orbital elements from the mean orbital elements, the temporal change rates of the mean orbital elements, and the target values. The control amount calculator 2 includes the feedforward control amount calculator 3 and the feedback control amount calculator 4. The feedforward control amount calculator 3 calculates the feedforward control amounts of the mean eccentricity vector and the mean inclination vector of the satellite 7 based on the temporal change rates of the mean orbital elements calculated by the orbit determiner 8. The feedback control amount calculator 4 calculates the feedback control amounts of the mean eccentricity vector and the mean inclination vector of the satellite 7 based on the mean orbital elements calculated by the orbit determiner 8 and the target values of the mean orbital elements set by the target value setter 1. Operations of the feedforward control amount calculator 3 and the feedback control amount calculator 4 are described below.

The feedforward control amount calculator 3 calculates the feedforward control amounts of the mean eccentricity vector and the mean inclination vector of the satellite 7 based on the temporal change rates of the mean orbital elements calculated by the orbit determiner 8. The temporal change rate of the mean eccentricity vector at a time $t_0$ is defined as $e'_{x0}$, $e'_{y0}$ and the temporal change rate of the mean inclination vector at the time $t_0$ is defined as $i'_{x0}$, $i'_{y0}$. In this case, the change amounts per orbit period, $\Delta e$ and $\Delta i$, of the mean eccentricity vector and the mean inclination vector are expressed by the following expressions (1) and (2) in which the superscript "$T$" represents the transposition.

$$\Delta e = [e'_{x0} T e'_{y0} T]^T \quad (1)$$

$$\Delta i = [i'_{x0} T i'_{y0} T]^T \quad (2)$$

Here, in the case of a geostationary satellite, the orbital motion period T of the satellite 7 is equal to the rotation period of the earth. In anticipation of the mean eccentricity vector and the mean inclination vector changing by $\Delta e$ and $\Delta i$ per orbital period, $\Delta e$ and $\Delta i$ multiplied by a constant are set as the feedforward control amounts of the mean eccentricity vector and the mean inclination vector. The feedforward control amounts $\delta e_{FF}$ and $\delta i_{FF}$ of the mean eccentricity vector and the mean inclination vector can be set, for example, as by the following expressions (3) and (4).

$$\delta e_{FF} = -(3/4)\Delta e \quad (3)$$

$$\delta i_{FF} = -(3/4)\Delta i \quad (4)$$

Operation of the feedforward control amount calculator 3 is described above. Next, operation of the feedback control amount calculator 4 is described.

The feedback control amount calculator 4 calculates the feedback control amounts of the mean eccentricity vector and the mean inclination vector of the satellite 7 based on the mean orbital elements calculated by the orbit determiner 8 and the target values of the mean orbital elements set by the target value setter 1. The mean eccentricity vector at the time $t_0$ is denoted by $e_0 = [e_{x0} \, e_{y0}]^T$ and the mean inclination vector at the time $t_0$ is denoted by $i_0 = [i_{x0} \, i_{y0}]^T$. Moreover, the target values of the mean eccentricity vector and the mean inclination vector set by the target value setter 1 are denoted by $e_{ref} = [e_{xref} \, e_{yref}]^T$ and $i_{ref} = [i_{xref} \, i_{yref}]^T$. Then, the difference between $e_0$ and $e_{ref}$ is defined as $De = e_0 - e_{ref}$ and the difference between $i_0$ and $i_{ref}$ is defined as $Di = i_0 - i_{ref}$. The feedback control amounts of the mean eccentricity vector and the mean inclination vector are defined as $\delta e_{FB}$ and $\delta i_{FB}$, respectively. Then, $\delta e_{FB}$ and $\delta i_{FB}$ are determined based on De and Di, respectively. For example, $\delta e_{FB}$ and $\delta i_{FB}$ can be determined as by the following expressions (5) and (6) as PID control.

[Math 1]

$$\delta e_{FB} = -k_{ep}De - k_{ed}De' - k_{ei}\int Dedt \quad (5)$$

$$\delta i_{FB} = -k_{ip}Di - k_{id}Di' - k_{ii}\int Didt \quad (6)$$

In the expressions (5) and (6), $k_{ep}$, $k_{ed}$, and $k_{ei}$ are a proportional gain, a differential gain, and an integral gain for calculating the feedback control amount of the mean eccentricity vector, respectively. $k_{ip}$, $k_{id}$, and $k_{ii}$ are a proportional gain, a differential gain, and an integral gain for calculating the feedback control amount of the mean inclination vector, respectively.

Operation of the feedback control amount calculator 4 is described above. The control amounts output by the control amount calculator 2 are the sums of the feedforward control amounts calculated by the feedforward control amount calculator 3 and the feedback control amounts calculated by the feedback control amount calculator 4.

The control amounts of the mean eccentricity vector and the mean inclination vector output by the control amount calculator 2 are defined as δe and δi, respectively. Then, δe and δi are expressed as by the following expressions (7) and (8).

$$\delta e = \delta e_{FF} + \delta e_{FB} \quad (7)$$

$$\delta i = i\delta_{FF} + \delta i_{FB} \quad (8)$$

Control of the mean eccentricity vector is control of the satellite 7 in the in-the-orbit-plane direction and control of the mean inclination vector is control of the satellite 7 in the out-of-the-orbit-plane direction.

The control amount calculator 2 calculates the control amounts of the mean eccentricity vector and the mean inclination vector based on the calculations of the expressions (1) to (8). The control amount calculator 2 realizes highly accurate orbit control with the feedforward control amounts and improves the stability/robustness of the control system with the feedback control. Operation of the control amount calculator 2 is described above. The following description is given with reference to flowcharts.

Figure 3:
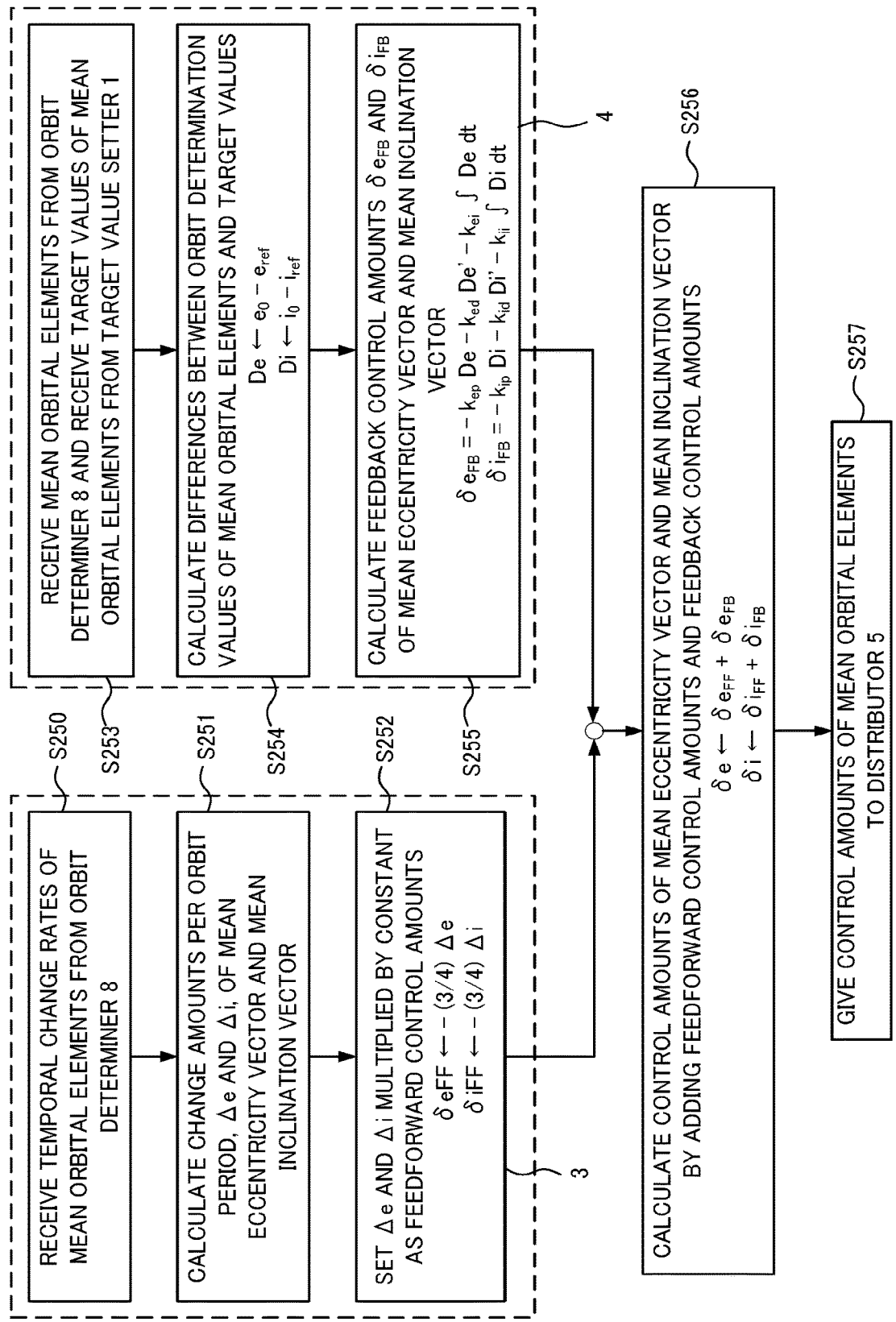
FIG. 3 is a flowchart illustrating an operation of a control amount calculator according to Embodiment 1.

FIG. 3 is a flowchart illustrating an operation of a control amount calculator according to Embodiment 1. The control amount calculator 2 includes the feedforward control amount calculator 3 and the feedback control amount calculator 4. The description is given as presented in the flowchart. In Step S250, the feedforward control amount calculator 3 receives the temporal change rates of the mean orbital elements from the orbit determiner 8 (Step S250). Next, in Step S251, the change amounts per orbit period, Δe and Δi, of the mean eccentricity vector and the mean inclination vector are calculated (Step S251). Next, in Step S252, Δe and Δi multiplied by a constant are set as the feedforward control amounts δeFF and δiFF (Step S252). The above Steps S250 to S252 are executed by the feedforward control amount calculator 3. The feedforward control amount calculator 3 may execute the processing using the processing circuit 101 or the processor 102, or may be realized by an independent processing circuit. Moreover, the feedforward control amount calculator 3 reads from the memory the temporal change rates of the mean orbital elements and the like, and stores in the memory the calculated change amounts Δe and Δi and the feedforward control amounts δeFF and δiFF.

Next is the operation of the feedback control amount calculator 4. First, in Step S253, the feedback control amount calculator 4 receives the mean orbital elements from the orbit determiner 8 and receives the target values of the mean orbital elements from the target value setter 1 (Step S253). Next, in Step S254, the differences De and Di between the orbit determination values and the target values of the mean orbital elements are calculated (Step S254). Next, in Step S255, the feedback control amounts δeFB and δiFB of the mean eccentricity vector and the mean inclination vector are calculated (Step S255). The above Steps S253 to S255 are executed by the feedback control amount calculator 4. The feedback control amount calculator 4 may execute the processing using the processing circuit 101 or the processor 102 or may be realized by an independent processing circuit. Moreover, the feedback control amount calculator 4 reads from memory the mean orbital elements, the target values of the mean orbital elements, and the like, and stores in the memory the calculated differences De and Di and the feedback control amounts δeFB and δiFB.

Next, in Step S256, the feedforward control amounts and the feedback control amounts are lastly added and the control amounts of the mean eccentricity vector and the mean inclination vector are calculated (Step S256). Furthermore, in Step S257, the calculated control amounts of the mean orbital elements are given to the distributor 5 (Step S257). The above Steps S256 and S257 are executed by the control amount calculator 2. The control amount calculator 2 stores the control amounts of the mean eccentricity vector and the mean inclination vector in the memory.

The distributor 5 of the orbit control device 9 receives the control amounts of the mean eccentricity vector and the mean inclination vector calculated by the control amount calculator 2, the target value of the mean ground longitude set by the target value setter 1, and the mean orbital elements and the temporal change rates of the mean orbital elements calculated by the orbit determiner 8. Then, the distributor 5 calculates the firing timings and the firing amounts of the thrusters realizing the control amounts of the mean eccentricity vector (the in-the-orbit-plane direction) and the mean inclination vector (the out-of-the-orbit-plane direction) and the control amount of the mean ground longitude (the in-the-orbit-plane direction) for maintaining the mean ground longitude in the vicinity of a target value.

The distributor 5 first calculates the magnitude δi=|δi| and the argument β of the control amount δi of the mean inclination vector at the time $t_0$ calculated by the control amount calculator 2. In other words, δi is expressed as by the following expression (9).

$$\delta i = [\delta_i \cos \beta \, \delta_i \sin \beta]^T \quad (9)$$

in which δi>0 is satisfied.

Next, the distributor 5 determines the first south-north control (out-of-the-orbit-plane control) timing. Here, control to correct change in the longitude is generally called east-west control and control to correct change in the latitude is generally called south-north control. An equation regarding the inclination vector (for example, the Gaussian planetary equation) indicates that an optimum timing for performing the south-north control is when the mean longitude of the satellite 7 is equal to β or β+π. π is the circular constant. Therefore, when the mean longitude $\lambda_0$ of the satellite 7 at a time $t_0$ is equal to β or β+π, the first south-north control is performed at the time $t_0$. If the mean longitude $\lambda_0$ is not equal to β or β+π, no firing amounts are calculated and no south-north control is performed at the time $t_0$. Operation of the distributor 5 is described below in two separate cases: when the mean longitude $\lambda_0$ is equal to β and when the mean longitude $\lambda_0$ is equal to β+π.

When the mean longitude $\lambda_0$ is equal to β, the distributor 5 calculates the first and second south-north control timings and firing amounts. The mean longitudes at the times of performing the first and second south-north controls are denoted by $\lambda_1$ and $\lambda_2$, respectively. Then, $\lambda_1$ and $\lambda_2$ are given by the following expressions (10) and (11).

$$\lambda_1 = \beta \tag{10}$$

$$\lambda_2 = \beta + \pi \tag{11}$$

The SW thruster and the SE thruster are used in the first south-north control and the NW thruster and the NE thruster are used in the second south-north control. The total of the firing amounts of the SW thruster and the SE thruster in the first south-north control is defined as $f_S$ and the total of the firing amounts of the NW thruster and the NE thruster in the second south-north control is defined as $f_N$. Then, $f_S$ and $f_N$ are determined as follows by the Gaussian planetary equation (Walker M J H, Ireland B, Owens J., A set of modified equinoctial orbit elements. Celestial Mechanics 1985, 36 (4): 409-419).

First, the components of the control amount $\delta e$ of the mean eccentricity vector calculated by the control amount calculator 2 are denoted by $\delta e = [\delta e_x, \delta e_y]^T$. Moreover, variables A and B dependent on $\delta e$ and $\delta i$ are defined as by the following expressions (12) and (13) in which a is the orbit semi-major axis and n is the mean orbit angular velocity of the satellite 7.

$$A = na\delta_i(-\delta e_x \cos \beta + e_y \sin \beta)/(\sin \theta \cos \phi) \tag{12}$$

$$B = na\delta_i/\cos \theta \tag{13}$$

in which the angle $\theta$ is the angle between the thrusters 91, 92, 93, and 94 and the $Y_B$ axis and the angle $\phi$ is the angle between the line segment connecting each of the thrusters 91, 92, 93, and 94 and the mass center of the satellite 7 and projected on the $X_B Z_B$ plane and the $X_B$ axis (FIG. 2).

Here, the above variables A and B have the dimension of velocity. The variable B is obtained by substituting the components of an impulse in the $Y_B$-axis direction that occurs due to firing of the SW thruster and the SE thruster in the Gaussian planetary equation regarding the inclination vector. Moreover, the variable A is obtained by substituting the components of an impulse in the $X_B$-axis direction that occurs due to firing of the SW thruster and the SE thruster in the Gaussian planetary equation regarding the eccentricity vector.

The distributor 5 gives $f_S$ and $f_N$ as by the following expression (14) based on the magnitudes of A and B.

[Math 2]

$$(f_S, f_N) = \begin{cases} \left(0, \dfrac{B}{2}\right) & (A < -B) \\ \left(\dfrac{B+A}{2}, \dfrac{B-A}{2}\right) & (-B < A \leq B) \\ \left(\dfrac{B}{2}, 0\right) & (B \leq A) \end{cases} \tag{14}$$

Next, the distributor 5 calculates the control amount for controlling the mean eccentricity vector (the in-the-orbit-plane control). Control of the mean eccentricity vector is achieved by combining the NW thruster and the SE thruster and firing each of them equally or combining the NE thruster and the SW thruster and firing each of them equally so as to apply a force in an orbit radius direction to the satellite 7. The mean longitude at the time of controlling the mean eccentricity vector is defined as $\lambda_r$ and the control amount in an orbit radius direction applied to the satellite at the time is defined as $f_r$. Moreover, the unit vector in the direction of the argument $\beta$ is defined as $\rho_\beta = [\cos \beta \sin \beta]^T$. $\lambda_r$ is given by the following expression (15) based on the angle between the unit vector $\rho_\beta$ and the control amount $\delta e$ of the mean eccentricity vector.

[Math 3]

$$\lambda_r = \begin{cases} \beta + \pi/2 & (\delta e \cdot \rho_\beta < 0) \\ \beta + 3\pi/2 & (\delta e \cdot \rho_\beta \geq 0) \end{cases} \tag{15}$$

in which $\delta e \cdot \rho_\beta$ represents the inner product of $\delta e$ and $\rho_\beta$. Moreover, $f_r$ is given by the following expression (16).

$$f_r = -na|\delta e \cdot \rho_\beta| \tag{16}$$

Next, the distributor 5 determines a distribution factor $\alpha_S$ of the firing amounts of the SW thruster and the SE thruster in the first south-north control and a distribution factor $\alpha_N$ of the firing amounts of the NW thruster and the NE thruster in the second south-north control by solving a constrained optimization problem. An evaluation function J of the optimization problem can be set, for example, as by the following expression (17).

$$J = |(2\alpha_S - 1)f_S - (2\alpha_N - 1)f_N| \tag{17}$$

The evaluation function expressed by the expression (17) requires that the difference between the impulse in the $Z_B$-axis direction that occurs in the first south-north control and the impulse in the $Z_B$-axis direction that occurs in the second south-north control should be decreased.

Moreover, the condition of constraint can be set, for example, as by the following expression (18).

$$\Lambda_{MT} = \Lambda_{Mref} - (\tfrac{1}{2})\Delta\Lambda_{Mtotal} \tag{18}$$

The expression (18) is a condition of constraint for controlling the mean ground longitude for a target value $\Lambda_{Mref}$. In the expression (18), $\Delta\Lambda_{Mtotal}$ is the total of the change amounts of the mean mean ground longitude of the satellite 7 resulting from the first south-north control at the mean longitude $\lambda_1$, the second south-north control at the mean longitude $\lambda_2$, and the mean eccentricity vector control at the mean longitude $k_r$, and is expressed by the following expression (19).

$$\Delta\Lambda_{Mtotal} = 2 \tan \theta \cos \phi \delta_i + 2|\delta e \cdot \rho_\beta| \tag{19}$$

The expression (19) is obtained by substituting in the Gaussian planetary equation regarding the mean ground longitude the impulse in the $X_B$-axis direction resulting from the first south-north control at the mean longitude $\lambda_1$, the second south-north control at the mean longitude $\lambda_2$, and the mean eccentricity vector control at the mean longitude $\lambda_r$. In the expression (18), $\Lambda_{Mref}$ is a target retention value of the ground longitude of the satellite 7 and set by the target value setter 1. Moreover, in the expression (18), $\Lambda_{MT}$ is the mean mean ground longitude of the satellite 7 after one orbit period since the first south-north control is performed, and expressed by the following expression (20).

$$\Lambda_{MT} = \Lambda_{M0} + \Lambda'_{M0}T + (\tfrac{1}{2})\Lambda''_{M0}T^2 + \Delta\Lambda_{Mtotal} - (3/a)\sin \theta \sin \phi[(2\alpha_S - 1)f_S + (\tfrac{1}{2})(2\alpha_N - 1)f_N]T \tag{20}$$

In the expression (20), the first three terms are obtained by time integration of the angular velocity and angular acceleration of the mean mean ground longitude immediately before the first south-north control is executed. Moreover, the last term is obtained by time integration of the angular velocity of the mean mean ground longitude that occurs in the first and second south-north controls. Here, $\Lambda_{M0}$, $\Lambda'_{M0}$, and $\Lambda''_{M0}$ are the mean mean ground longitude, the angular velocity of the mean mean ground longitude, and the angular acceleration of the mean mean ground longitude of the satellite 7 at the time $t_0$, respectively. These are calculated by the orbit determiner 8. The distributor 5 determines the distribution factors $\alpha_S$ and $\alpha_N$ so as to minimize the evaluation function J given by the expression (17) while satisfying the condition of constraint for controlling the mean ground longitude for a target value $\Lambda_{Mref}$ given by the expression (18).

Next, the distributor 5 determines the firing amounts in the first and second south-north controls from the calculated distribution factors $\alpha_S$ and $\alpha_N$ as by the expressions (21) and (22). In the expressions (21) and (22), the subscripts NW, NE, SW, and SE of the firing amount f represent the NW thruster, the NE thruster, the SW thruster, and the SE thruster, respectively. Moreover, the numeric subscript 1 indicates the first time and the numeric subscript 2 indicates the second time. The expression (21) represents the firing amounts of the thrusters in the first south-north control. The expression (22) represents the firing amounts of the thrusters in the second south-north control.

$$f_{NW1}=0, f_{NE1}=0, f_{SW1}=\alpha_S f_S, f_{SE1}=(1-\alpha_S)f_S \quad (21)$$

$$f_{NW2}=\alpha_N f_N, f_{NE2}=(1-\alpha_N)f_N, f_{SW2}=0, f_{SE2}=0 \quad (22)$$

The distributor 5 gives the calculated firing timings and firing amounts of the south-north controls and the mean eccentricity vector control to the thruster controller 6. The thruster controller 6 controls the thrusters 91, 92, 93, and 94 based on the firing timings and the firing amounts calculated by the distributor 5.

Returning to the determination of the south-north control timing, operation of the distributor 5 when the mean longitude $\lambda_0$ is equal to $\beta+\pi$ is described. When the mean longitude $\lambda_0$ is equal to $\beta+\pi$, the distributor 5 calculates the first and second south-north control timings and firing amounts. The mean longitudes at the times of performing the first and second south-north controls are denoted by $\lambda_1$ and $\lambda_2$, respectively. Then, $\lambda_1$ and $\lambda_2$ are given by the following expressions (23) and (24).

$$\lambda_1=\beta+\pi \quad (23)$$

$$\lambda_2=\beta+2\pi \quad (24)$$

The NW thruster and the NE thruster are used in the first south-north control and the SW thruster and the SE thruster are used in the second south-north control. The total of the firing amounts of the NW thruster and the NE thruster in the first south-north control is defined as $f_N$ and the total of the firing amounts of the SW thruster and the SE thruster in the second south-north control is defined as $f_S$. The method of calculating $f_S$ and $f_N$ are described below.

The components of the calculated control amount $\delta e$ of the mean eccentricity vector are denoted by $\delta e = [\delta e_x \ \delta e_y]^T$. Moreover, the orbit semi-major axis and the mean orbit angular velocity of the satellite 7 are denoted by a and n, respectively. Then, variables A and B dependent on $\delta e$ and $\delta i$ are defined as by the following expressions (25) and (26).

$$A=na\delta_i(-\delta e_x \cos \beta + \delta e_y \sin \beta)/(\sin \theta \cos \phi) \quad (25)$$

$$B=na\delta_i/\cos \theta \quad (26)$$

in which the angle $\theta$ is the angle between the thrusters 91, 92, 93, and 94 and the $Y_B$ axis and the angle $\phi$ is the angle between the line segment connecting each of the thrusters 91, 92, 93, and 94 and the mass center of the satellite 7 and projected on the $X_B Z_B$ plane and the $X_B$ axis (FIG. 2).

The distributor 5 gives $f_S$ and $f_N$ as by the following expression (27) based on the magnitudes of A and B.

[Math 4]

$$(f_S, f_N) = \begin{cases} \left(0, \dfrac{B}{2}\right) & (A < -B) \\ \left(\dfrac{B+A}{2}, \dfrac{B-A}{2}\right) & (-B < A \le B) \\ \left(\dfrac{B}{2}, 0\right) & (B \le A) \end{cases} \quad (27)$$

Next, the distributor 5 calculates the control amount for controlling the mean eccentricity vector. Control of the mean eccentricity vector is achieved by combining the NW thruster and the SE thruster and firing each of them equally or combining the NE thruster and the SW thruster and firing each of them equally so as to apply a force in an orbit radius direction to the satellite 7. The mean longitude at the time of controlling the mean eccentricity vector is defined as $\lambda_r$ and the control amount in an orbit radius direction applied to the satellite at the time is defined as $f_r$. Moreover, the unit vector in the direction of the argument 1 is defined as $\rho_\beta = [\cos \beta \ \sin \beta]^T$. The mean longitude $\lambda_r$ at the time of controlling the mean eccentricity vector is given by the following expression (28) based on the angle between the unit vector $\rho_\beta$ and the control amount $\delta e$ of the mean eccentricity vector.

[Math 5]

$$\lambda_r = \begin{cases} \beta + 3\pi/2 & (\delta e \cdot \rho_\beta \ge 0) \\ \beta + 5\pi/2 & (\delta e \cdot \rho_\beta < 0) \end{cases} \quad (28)$$

in which $\delta e \cdot \rho_\beta$ represents the inner product of $\delta e$ and $\rho_\beta$. Moreover, the control amount $f_r$ in an orbit radius direction (the $X_B$-axis direction) applied to the satellite is given by the following expression (29).

$$f_r = -na|\delta e \cdot \rho_\beta| \quad (29)$$

Next, the distributor 5 determines the distribution factor $\alpha_N$ of the firing amounts of the NW thruster and the NE thruster in the first south-north control and the distribution factor $\alpha_S$ of the firing amounts of the SW thruster and the SE thruster in the second south-north control by solving a constrained optimization problem. An evaluation function J of the optimization problem can be set, for example, as by the following expression (30).

$$J=|(2\alpha_S-1)f_S-(2\alpha_N-1)f_N| \quad (30)$$

Moreover, the condition of constraint can be set, for example, as by the following expression (31).

$$\Lambda_{MT}=\Lambda_{Mref}-(\tfrac{1}{2})\Delta\Lambda_{Mtotal} \quad (31)$$

In the expression (31), $\Delta\Lambda_{Mtotal}$ is the total of the change amounts of the mean mean ground longitude of the satellite 7 resulting from the first south-north control at the mean longitude $\lambda_1$, the second south-north control at the mean longitude $\lambda_2$, and the mean eccentricity vector control at the mean longitude $\lambda_r$, and is expressed by the following expression (32).

$$\Delta\Lambda_{Mtotal}=2 \tan \theta \cos \phi \delta_i + 2|\delta e \cdot \rho_\beta| \quad (32)$$

$\Lambda_{Mref}$ is a target retention value of the ground longitude of the satellite 7 and set by the target value setter 1. Moreover, in the expression (31), $\Lambda_{MT}$ is the mean mean ground longitude of the satellite 7 after elapse of one orbit period from when the first south-north control is performed, and expressed by the following expression (33).

$$\Lambda_{MT} = \Lambda_{M0} + \Lambda'_{M0}T + (\tfrac{1}{2})\Lambda''_{M0}T^2 + \Delta\Lambda_{Mtotal} - (3/a)\sin\theta$$
$$\sin\phi[(2\alpha_N - 1)f_N + (\tfrac{1}{2})(2\alpha_S - 1)f_S]T \quad (33)$$

Here, $\Lambda_{M0}$, $\Lambda'_{M0}$, and $\Lambda''_{M0}$ are the mean mean ground longitude, the angular velocity of the mean mean ground longitude, and the angular acceleration of the mean mean ground longitude of the satellite 7 at the time $t_0$, respectively. These are calculated by the orbit determiner 8. The distributor 5 determines the distribution factors $\alpha_S$ and $\alpha_N$ so as to minimize the evaluation function J given by the expression (30) while satisfying the condition of constraint given by the expression (31).

The distributor 5 determines the firing amounts in the first and second south-north controls from the calculated distribution factors $\alpha_S$ and $\alpha_N$ as by the expressions (34) and (35). The subscripts of the firing amount f are the same as those in the expressions (21) and (22). The expression (34) represents the firing amounts of the thrusters in the first south-north control. The expression (35) represents the firing amounts of the thrusters in the second south-north control.

$$f_{NW1} = \alpha_N f_N, f_{NE1} = (1-\alpha_N)f_N, f_{SW1} = 0, f_{SE1} = 0 \quad (34)$$

$$f_{NW2} = 0, f_{NE2} = 0, f_{SW2} = \alpha_S f_S, f_{SE2} = (1-\alpha_S)f_S \quad (35)$$

The expressions (12) to (14), (16), and (18) to (20) are equations taking into account coupling of the out-of-the-orbit-plane motion and the in-the-orbit-plane motion. The distributor 5 calculates the firing timings and the firing amounts of the thrusters for realizing the control amounts of the mean orbital elements calculated by the control amount calculator 2 by solving the equations taking into account coupling of the out-of-plane motion and the in-plane motion due to thruster firing amounts at multiple times, and combining one or more thruster firings controlling mainly the out-of-the-orbit plane direction and one or more thruster firings controlling mainly the in-the-orbit-plane direction.

The distributor 5 gives the calculated firing timings and firing amounts of the thrusters in the south-north control and the mean eccentricity vector control to the thruster controller 6. The thruster controller 6 controls the thrusters 91, 92, 93, and 94 based on the firing timings and the firing amounts calculated by the distributor 5.

Figure 4:
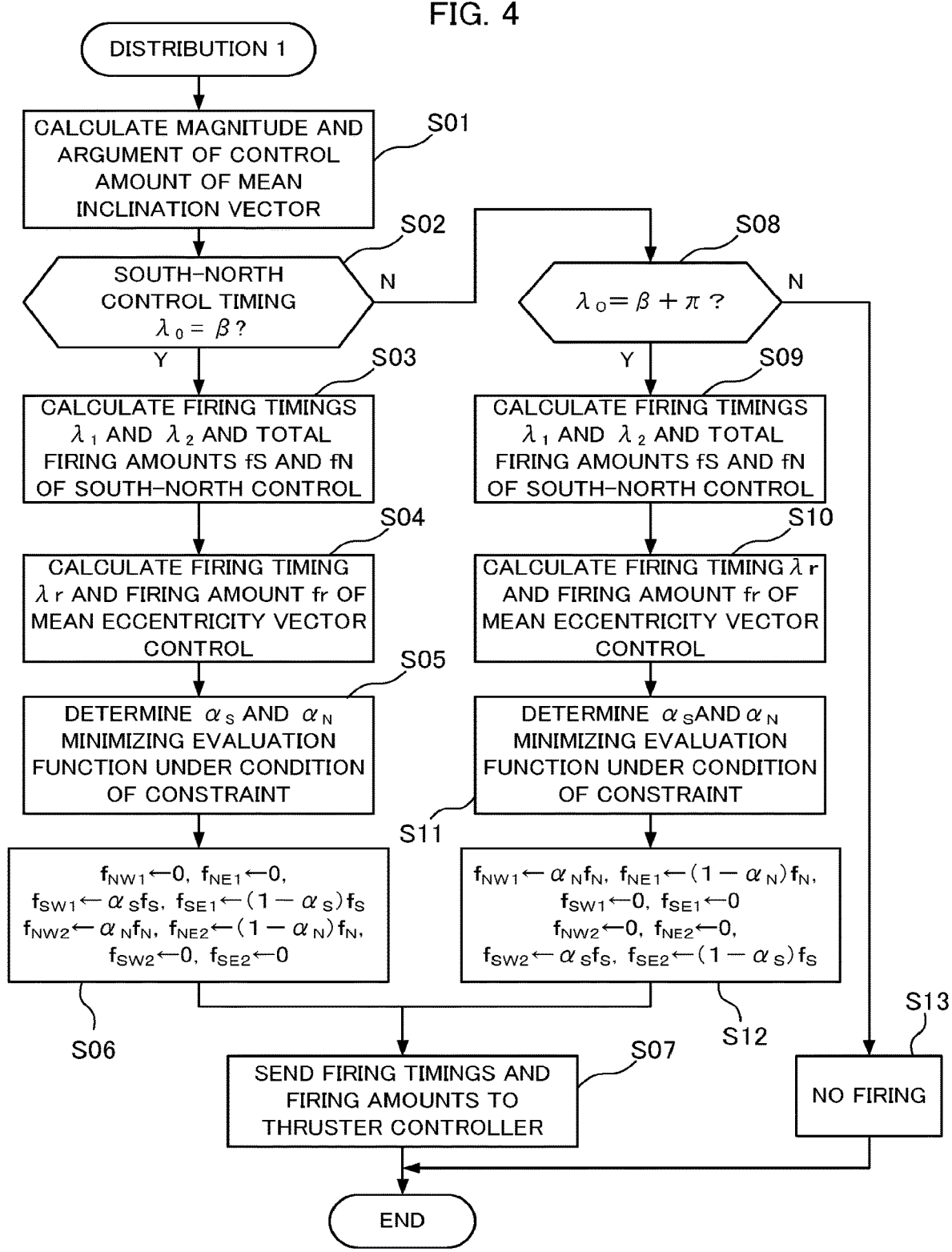
FIG. 4 is a flowchart illustrating an operation of a distributor according to Embodiment 1.

FIG. 4 is a flowchart illustrating an operation of the distributor 5 according to Embodiment 1. The distributor 5 first calculates the magnitude and argument of the control amount of the mean inclination vector expressed by the expression (9) (Step S01). Then, the distributor 5 determines the south-north control timing (Step S02). When the mean longitude $\lambda_0$ of the satellite 7 is equal to the argument P (Step S02; Y), the distributor 5 calculates the firing timings $\lambda_1$ and $\lambda_2$ by the expressions (10) and (11) and calculates their respective total firing amounts $f_S$ and $f_N$ by the expressions (12) to (14) (Step S03). The distributor 5 stores in the memory the magnitude and argument of the control amount of the mean inclination vector, the south-north control firing timings $\lambda_1$ and $\lambda_2$, and the total firing amounts $f_S$ and $f_N$.

Next, the distributor 5 calculates the firing timing $\lambda_r$ and the firing amount $f_r$ of the mean eccentricity vector control by the expressions (15) and (16) (Step S04). Then, the distributor 5 determines the distribution factors $\alpha_S$ and $\alpha_N$ minimizing the evaluation function J of the expression (17) under the condition of constraint of the expression (18) (Step S05). The distributor 5 calculates the first and second firing amounts of the thrusters from the distribution factors $\alpha_S$ and $\alpha_N$ by the expressions (21) and (22) (Step S06). Then, the distributor 5 sends the calculated firing timing and firing amount to the thruster controller 6 (Strep S07). The distributor 5 stores in the memory the firing timing $\lambda_r$ and the firing amount $f_r$ of the mean eccentricity vector control, the distribution factors $\alpha_S$ and $\alpha_N$, and the firing timing and firing amount.

If the mean longitude $\lambda_0$ is not equal to the argument $\beta$ in the Step S02 (Step S02; N) and $\lambda_0$ is equal to $\beta+\pi$ (Step S08; Y), the distributor 5 calculates the south-north control firing timings $\lambda_1$ and $\lambda_2$ by the expressions (23) and (24) and calculates their respective total firing amounts $f_S$ and $f_N$ by the expressions (25) to (27) (Step S09). The distributor 5 stores the south-north control firing timings $\lambda_1$ and $\lambda_2$ and the total firing amounts $f_S$ and $f_N$ in the memory.

Next, the distributor 5 calculates the firing timing $\lambda_r$ and the firing amount $f_r$ of the mean eccentricity vector control by the expressions (28) and (29) (Step S10). Then, the distributor 5 determines the distribution factors $\alpha_S$ and $\alpha_N$ minimizing the evaluation function J of the expression (30) under the condition of constraint of the expression (31) (Step S11). The distributor 5 calculates the first and second firing amounts of the thrusters from the distribution factors $\alpha_S$ and $\alpha_N$ by the expressions (34) and (35) (Step S12). Then, the distributor 5 sends the calculated firing timing and firing amounts to the thruster controller 6 (Step S07). The distributor 5 stores in the memory the firing timing $\lambda_r$ and the firing amount $f_r$ of the mean eccentricity vector control, the distribution factors $\alpha_S$ and $\alpha_N$, and the first and second firing amounts of the thrusters.

If the mean longitude $\lambda_0$ is not equal to the argument $\beta$ or $\beta+\pi$ in the Step S02 and Step S08 (Step S02; N, Step S08; N), no firing amounts are calculated and no firing is performed (Step S13) and the processing at the time ends.

With the above configuration of Embodiment 1, the distributor 5 can calculate the thruster firing rules suppressing the propellant consumption with low calculation cost by analytically solving the Gaussian planetary equation including coupling of the in-the-orbit-plane and the out-of-the-orbit-plane dependent on the thruster disposition angles and multiple thruster firings.

Moreover, the firing rules restricting the number of thrusters firing simultaneously to two or one can be calculated and therefore, the power consumption can be suppressed. Specifically, the distributor 5 can obtain firing rules restricting the number of electric propulsion devices firing simultaneously to two or one with a small amount of calculation, whereby the satellite orbit can be kept with high accuracy while suppressing the power consumption. Then, optimum south-north control firing timings based on the control amount of the mean inclination vector can be calculated, and therefore, highly accurate south-north control can be realized. Moreover, the mean mean ground longitude, the mean inclination vector, and the mean eccentricity vector can be controlled simultaneously in the south-north control. Furthermore, the mean eccentricity vector in the vicinity of a target value can be kept by controlling the mean eccentricity vector one time in every orbit period in addition to two south-north controls, whereby the ground longitude of the satellite 7 can be kept in the vicinity of a target value with high accuracy. According to Embodiment 1, the interval between the south-north control and the mean eccentricity vector control can be ¼ of the orbit period and overlapping of the timings of firing the thrusters in the south-north control and in the mean eccentricity vector control can be prevented.

Embodiment 2

In Embodiment 2, a feasible timing of firing the thrusters in one orbit period is preset. Then, the second to fourth thruster firing amounts and whether the firing is possible are determined based on the control amounts of the mean eccentricity vector and the mean inclination vector calculated for each timing by the control amount calculator. The configuration of Embodiment 2 is the same as that of Embodiment 1; only operation of the distributor 5 of the orbit control device 9 is different. The others, namely the target value setter 1, the control amount calculator 2, the thruster controller 6, and the orbit determiner 8, are the same as those in Embodiment 1.

The distributor 5 receives, as in Embodiment 1, the control amounts of the mean eccentricity vector and the mean inclination vector calculated by the control amount calculator 2, the target value of the mean ground longitude set by the target value setter 1, and the mean orbital elements and the temporal change rates of the mean orbital elements calculated by the orbit determiner 8. Then, the distributor 5 calculates the firing timings and the firing amounts of the thrusters realizing the control amounts of the mean eccentricity vector and the mean inclination vector and the control amount of the mean ground longitude for maintaining the mean ground longitude in the vicinity of a target value.

At this point, in Embodiment 2, the thrusters are assumed to be fired up to four times in one period. Using the mean longitude $\lambda$, the timings are denoted by $\lambda_1, \lambda_2, \lambda_3,$ and $\lambda_4$ and given by the following expressions (48) to (51).

$$\lambda_1 = \lambda_c \quad (48)$$

$$\lambda_2 = \lambda_1 + \pi/2 \quad (49)$$

$$\lambda_3 = \lambda_1 + \pi \quad (50)$$

$$\lambda_4 = \lambda_1 + 3\pi/2 \quad (51)$$

$\lambda_c$ is a preset first thruster firing timing. In Embodiment 2, $\lambda_c$ is fixed to a proper value near the ascending node $\Omega$. For example, $\lambda_c = 80$ [deg] is set. Then, the thrusters are fired at equal intervals from the first thruster firing with the phase apart from each other by $\pi/2$. However, $\lambda_c$ and $\lambda_1, \lambda_2, \lambda_3,$ and $\lambda_4$ can be given some values other than the above. Here, the thrusters are assumed to be fired four times. However, the thrusters may be fired as few as two times from actually calculated control amounts. The method of calculating the control force necessary for keeping the orbit and the firing amounts of the thrusters is described below.

At the beginning, the distributor 5 calculates the control force in the out-of-plane direction. First, the distributor 5 receives the control amount of the mean eccentricity vector, $\delta e = [\delta e_x \; \delta e_y]^T$, and the control amount of the mean inclination vector, $\delta i = [\delta i_x \; \delta i_y]^T$, calculated by the control amount calculator 2. Moreover, the distributor 5 receives the target value of the mean mean ground longitude, $\Lambda_{MTref}$, from the target value setter 1. Based on these, the distributor 5 calculates the control force in the out-of-plane direction, $f_{hi}$ (i=1 to 4), with the thruster firing timings. The following unit vector is used in calculating the control force: $\rho_{ei} = [\sin \lambda_i \; -\cos \lambda_i]^T$, $\rho_{ii} = [\cos \lambda_i \; \sin \lambda_i]^T$. Then, the control force in the out-of-plane direction, $f_{hi}$, with each timing is given so as to satisfy the following two expressions.

$$|f_{hi} - f_{h(i+2)}| = an\delta e \cdot \rho_{ei}/(\tan\theta \cos\phi) \quad (52)$$

$$f_{hi} - f_{h(i+2)} = an\delta i \cdot \rho_{ei} \quad (53)$$

in which $\theta$ and $\phi$ are the angles given in FIG. 2.

The right side of the expression (52) is denoted by $\delta e_i$ and the right side of the expression (53) is denoted by $\delta i_i$, and $f_{hi}$ is determined in each case depending on the magnitude relation between $\delta e_i$ and $\delta i_i$. In dividing into cases, priority is given to realizing the control amount of the mean eccentricity vector. As $f_{hi}$ is fixed from the thruster positions, $f_{ri}$ is automatically determined. When $\delta e_i > \delta i_i$, meeting the control amount of the mean inclination vector leads to shortage in the control amount of the mean eccentricity vector. Therefore, in such a case, $f_{hi}$ is determined on the basis of the control amount of the mean eccentricity vector.

(1) When $|\delta e_i| > |\delta i_i|$, (1a) when $\delta e_i < 0$ $$f_{hi} = \text{sign}(\delta i_i)|\delta e_i|, f_{h(i+2)} = 0 \quad (54)$$

(1b) when $\delta e_i > 0$ $$f_{hi} = 0, f_{i(i+2)} = -\text{sign}(\delta i_i)|\delta e_i| \quad (55)$$

(2) When $|\delta e_i| < |\delta i_i|$, (2a) when $\delta e_i + \delta i_i > 0$ and $\delta e_i - \delta i_i < 0$ $$f_{hi} = (1/2)(\delta e_i + \delta i_i), f_{h(i+2)} = (1/2)(\delta e_i - \delta i_i) \quad (56)$$

(2b) when $\delta e_i + \delta i_i < 0$ and $\delta e_i - \delta i_i > 0$ $$f_{hi} = -(1/2)(\delta e_i + \delta i_i), f_{h(i+2)} = -(1/2)(\delta e_i - \delta i_i) \quad (57)$$

Next, $f_{\theta i}$ (i=1 to 4) necessary for the east-west control (keeping the ground longitude) is determined. The distributor 5 determines $f_{\theta i}$ (i=1 to 4) so as to satisfy the following conditional expression (58).

[Math 6]

$$\sum_{i=1}^{4} \frac{5-i}{4} f_{\theta i} = -\frac{a}{3T}\left(\Lambda_{Mref} - \Lambda'_{M0}T - \Lambda''_{M0}T - \frac{\tan\theta\cos\phi}{na}\sum_{i=1}^{4}|f_{hi}|\right) \quad (58)$$

in which a is the orbit semi-major axis, n is the mean orbit angular velocity, and $\theta$ and $\phi$ are the angles given in FIG. 2.

The thruster firing for giving the above $f_{\theta i}$ is realized by, as a general rule, distributing the firing amount between the SW thruster and the SE thruster or between the NW thruster and the NE thruster in giving the control force in the out-of-plane direction, $f_{hi}$ (distribution of the firing time in the case of electric propulsion). When $f_{hi}$ and $f_{\theta i}$ are given, the distribution amounts can uniquely be determined based on the thruster disposition angles. However, in Embodiment 2, when determining $f_{\theta i}$, $f_{hi}$ is different in each control cycle and in some cases, a sufficient total of $f_{\theta i}$ potentially may not be obtained in four controls. In such a case, two or one thruster is fired in the first thruster firing and necessary $f_\theta$ is additionally given. The distributor 5 gives the above calculation results to the thruster controller 6.

The basic operation in Embodiment 2 is described above. For further saving of the propellant, the following control is performed in calculating the out-of-plane control amount $f_{hi}$. When the value of the mean inclination vector after the control is estimated and the value falls within a preset acceptable range, in other words the error i of the mean inclination vector is a sufficiently small value, for example $|i| < 0.003$ [deg.], the control amount is tailored to the control amount necessary for ordinary eccentricity vector control and the number of times of firing the thrusters is reduced to three or less.

Figure 5:
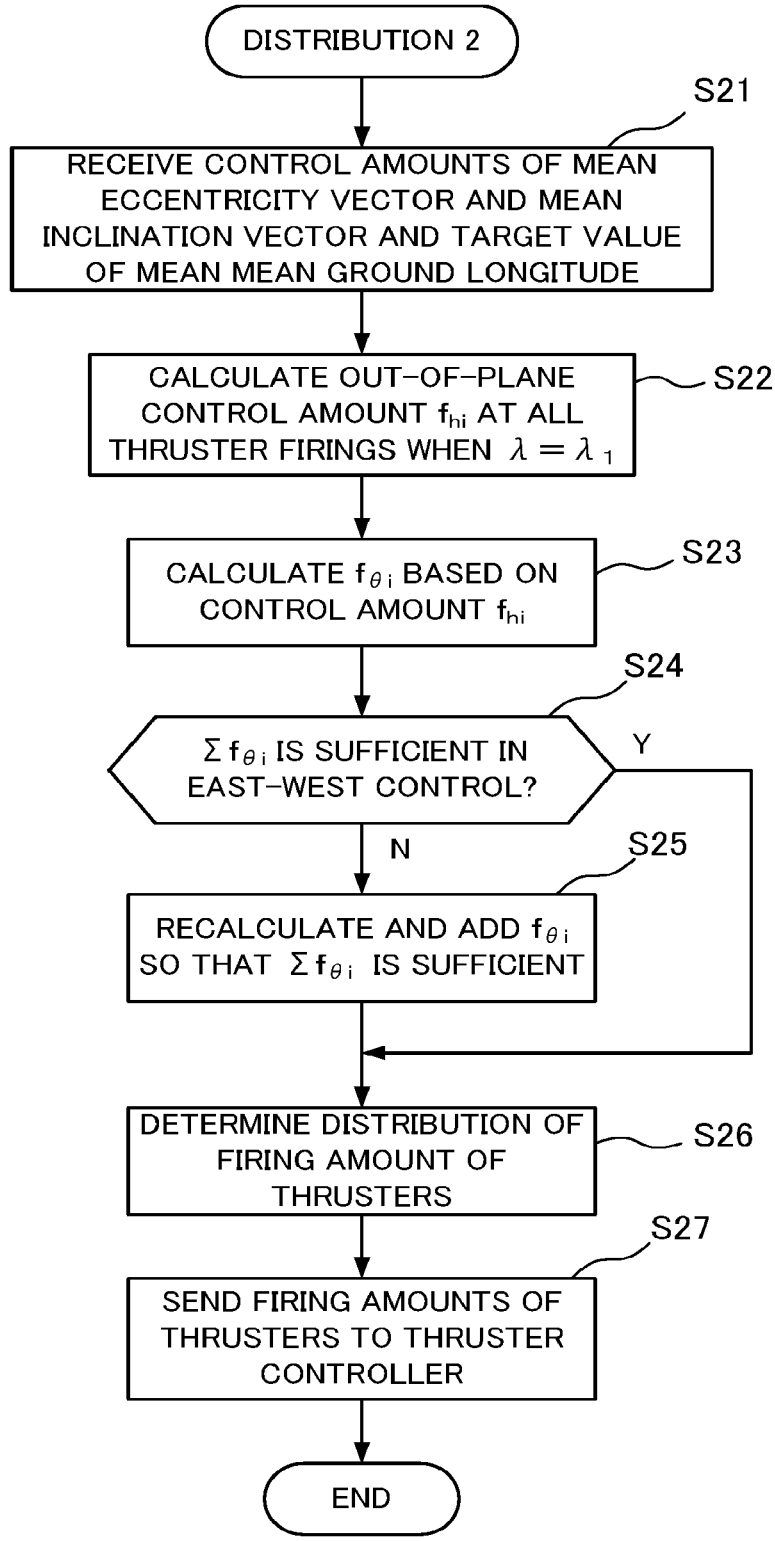
FIG. 5 is a flowchart illustrating an operation of a distributor according to Embodiment 2.

FIG. 5 is a flowchart illustrating an operation of the distributor 5 according to Embodiment 2. The distributor 5 first receives the control amounts of the mean eccentricity vector and the mean inclination vector, the target value of the mean mean ground longitude, and the like (Step S21). Then, when the mean longitude λ becomes equal to the set $\lambda_1$ (=$\lambda_C$), the distributor 5 calculates the out-of-plane control amount $f_{hi}$ satisfying the expressions (52) and (53) based on the expressions (54) and (57) in each case depending on the magnitude relation between $\delta e_i$ and $\delta i_i$ (Step S22). The distributor 5 reads from the memory the control amounts of the mean eccentricity vector and the mean inclination vector, the target value of the mean mean ground longitude, and $\delta e_i$ and $\delta i_i$, and stores the out-of-plane control amount $f_{hi}$ in the memory.

Next, the distributor 5 calculates $f_{\theta i}$ (i=1 to 4) necessary for the east-west control (keeping the ground longitude) based on the control amount $f_{hi}$ so as to satisfy the expression (58) (Step S23). A determination is made as to whether E $f_{\theta i}$ is sufficient in the east-west control (Step S24). If not sufficient (Step S24; N), $f_{\theta i}$ is recalculated and added so that $\Sigma f_{\theta i}$ becomes sufficient (Step S25). If $f_{\theta i}$ is sufficient in the east-west control (Step S24; Y), no recalculation is executed. The distributor 5 reads the control amount $f_{hi}$ from the memory and stores $f_{\theta i}$ (i=1 to 4) necessary for the east-west control (keeping the ground longitude) in the memory.

The distributor 5 determines, as in Embodiment 1, the distribution of the firing amounts of the thrusters with each thruster firing timing (Step S26), and sends the fixed firing timing and the firing amounts of the thrusters to the thruster controller 6 (Step S27). The distributor 5 stores the distribution of the firing amounts of the thrusters with each thruster firing timing in the memory.

According to the above Steps S21 to S27, in Embodiment 2, the firing timings and the firing amounts of the thrusters realizing the control amounts of the mean eccentricity vector and the mean inclination vector and the control amount of the mean ground longitude for maintaining the mean ground longitude in the vicinity of a target value are calculated.

With the above configuration and operation of Embodiment 2, the firing intervals between thruster firings can be fixed and the error in keeping the orbit in the longitudinal direction that results from change in the control time intervals can be reduced. This Embodiment 2 is useful where the east-west control with highest accuracy (for example, the ground longitude error Δλ=0.005 [deg.] or lower) is required.

Embodiment 3

In Embodiment 3, two of the four thrusters are combined to perform the south-north control one time in one orbit period and two thrusters are combined to perform the east-west control two times in one orbit period. The configuration of Embodiment 3 is the same as that of Embodiment 1; only operation of the distributor 5 of the orbit control device 9 is different. The others, namely the target value setter 1, the control amount calculator 2, the thruster controller 6, the satellite 7, and the orbit determiner 8, are the same as those in Embodiment 1. Distributor 5 is the only component different from that in Embodiment 1; therefore, the distributor 5 is described.

The firing amounts of the thrusters, the thruster 91 (NW thruster), the thruster 92 (NE thruster), the thruster 93 (SW thruster), and the thruster 94 (SE thruster), illustrated in FIG. 2 are denoted by $f_{NW}$, $f_{NE}$, $f_{SW}$, and $f_{SE}$, respectively. On the premise that two thrusters are fired simultaneously, the northward firing amount $f_N$, the southward firing amount $f_S$, the eastward firing amount $f_E$, and the westward firing amount $f_W$ are each expressed as follows.

$$f_N=f_{NW}+f_{NE}, f_S=f_{SW}+f_{SE}$$

$$f_E=f_{NE}+f_{SE}, f_W=f_{NW}+f_{SW}$$

Of the received control amounts of the orbital elements, the distributor 5 controls the control amount of the mean inclination with the northward firing amount $f_N$ or the southward firing amount $f_S$. Since the eastward firing amount $f_E$ and the westward firing amount $f_W$ do not affect the mean inclination, the northward firing amount $f_N$ or the southward firing amount $f_S$ can be determined only from the control amount of the mean inclination. The firing timing can be determined from the argument β of the control amount δi of the mean inclination vector. The mean inclination can be controlled using either one, the northward firing amount $f_N$ or the southward firing amount $f_S$. However, the calculation is executed for both cases and the one yielding a smaller total value of firing amounts is lastly used.

Next, since the mean eccentricity and the mean mean ground longitude are affected by the northward firing amount $f_N$ or the southward firing amount $f_S$, the distributor 5 determines a new control amount of the mean eccentricity vector and a new target value of the mean mean ground longitude with the addition of correction amounts. The correction amounts can be calculated by substituting the components in the $X_B$-axis and $Z_B$-axis directions of the northward firing amount $f_N$ or the southward firing amount $f_S$ in the Gaussian planetary equations regarding the eccentricity vector and the mean ground longitude.

The distributor 5 determines the eastward firing amount $f_E$ and the westward firing amount $f_W$ from the new control amount of the mean eccentricity vector and the new target value of the mean mean ground longitude. For determining the firing amounts corresponding to the control amount of the mean eccentricity vector and the target value of the mean mean ground longitude, the eastward firing amount $f_E$ and the westward firing amount $f_W$ for a total of two times are necessary. In other words, a solution to give an eastward firing amount $f_E$ or a westward firing amount $f_W$ at a longitude and give an eastward firing amount $f_E$ or a westward firing amount $f_W$ at a different longitude is obtained. Consequently, one of the solutions, $f_E$ and $f_W$ each at one time, $f_E$ at two times, and $f_W$ at two times, in the firing in the east-west direction is obtained. With this total of two times of firing and one time of firing with $f_N$ or $f_S$, a series of control operation ends. Thus, a total of three times of firing is performed in a series of control operation.

Next, the distributor 5 determines which to use, the northward firing amount $f_N$ or the southward firing amount $f_S$, as follows. The distributor 5 compares the total value of the firing amounts combining the east-west firing amount when $f_N$ is used and the total value of the firing amounts combining the east-west firing amount when $f_S$ is used, and adopts the one yielding a smaller total value as the finalized firing. Using the one with a lower firing amount as just stated, the longitudes at the times of implementing one south-north firing with $f_N$ or $f_S$ and two east-west firings are apart. Thus, the effect of not overlapping these firing timings is also obtained.

Using a combination of two thrusters in the south-north firing and in the east-west firing as described above, the mean inclination, the mean eccentricity, and the mean mean ground longitude can be controlled at desirable values with one south-north and two east-west thruster firings in a series of control operation.

Moreover, instead of simultaneous firing of two thrusters yielding a force eastward or westward in the two east-west thruster firings, the mean inclination can be affected by replacing some or all with firing of only one thruster based on the above-described calculation of the thruster firing amounts. In such a case, since the mean inclination is affected by the east-west thruster firing, the south-north thruster firing amount cannot simply be calculated. However, both or one of the two east-west thruster firings can be planned with firing of only one thruster by performing numeric search for, for example, replacing all with firing of only one thruster based on the solution to simultaneous firing of two thrusters. Such a plan results in controlling the mean inclination in part with the east-west direction thruster firing, whereby the effect of keeping the total value of firing amounts low is obtained.

Figure 6:
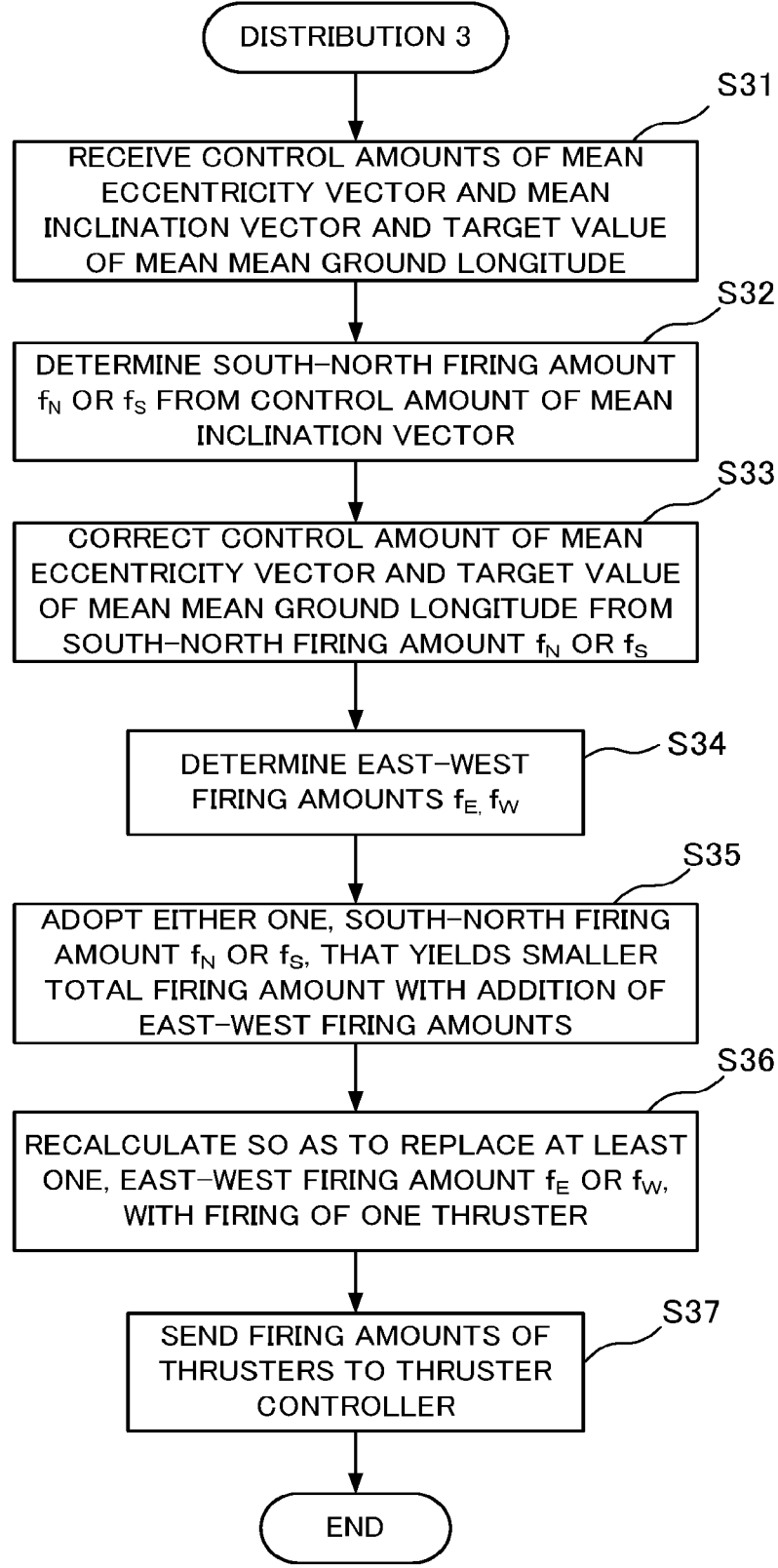
FIG. 6 is a flowchart illustrating an operation of a distributor according to Embodiment 3.

FIG. 6 is a flowchart illustrating an operation of the distributor 5 according to Embodiment 3. The distributor 5 first receives the control amounts of the mean eccentricity vector and the mean inclination vector, the target value of the mean mean ground longitude, and the like (Step S31). Then, the distributor 5 determines the northward firing amount $f_N$ or the southward firing amount $f_S$ (a south-north firing amount $f_N$ or $f_S$) from the control amount of the mean inclination vector (Step S32). The distributor 5 reads from the memory the control amounts of the mean eccentricity vector and the mean inclination vector, the target value of the mean mean ground longitude, and the like, and stores in the memory the northward firing amount $f_N$ or the southward firing amount $f_S$ (the south-north firing amount $f_N$ or $f_S$).

Next, the distributor 5 corrects the new control amount of the mean eccentricity and the new target value of the mean mean ground longitude from the determined south-north firing amount $f_N$ or $f_S$ (Step S33). Then, the distributor 5 determines the eastward firing amount $f_E$ and the westward firing amount $f_W$ (east-west firing amounts $f_E$ and $f_W$) from the new control amount of the mean eccentricity and the new target value of the mean mean ground longitude (Step S34). The distributor 5 reads from the memory the south-north firing amount $f_N$ or $f_S$, and stores in the memory the new control amount of the mean eccentricity, the new target value of the mean mean ground longitude, and the eastward firing amount $f_E$ and the westward firing amount $f_W$ (the east-west firing amounts $f_E$ and $f_W$).

The distributor 5 adopts either one, the south-north firing amount $f_N$ or $f_S$, that yields a lower total firing amount with the addition of the east-west firing amounts (Step S35). Furthermore, the distributor 5 executes recalculation to replace some or all of simultaneous firing of two thrusters yielding a force eastward or westward with firing of only one thruster in the two east-west thruster firings based on the calculation of the thruster firing amounts (Step S36). Then, the distributor 5 sends the calculated thruster firing amounts to the thruster controller 6 (Step S37). The distributor 5 stores the calculated thruster firing amounts in the memory.

With the above configuration of Embodiment 3, the mean inclination, the mean eccentricity, and the mean mean ground longitude can be controlled at desired values with one south-north firing and two east-west firings through simple calculation on the premise of firing of a combination of two thrusters. Moreover, with the configuration of Embodiment 3, the effect of keeping the total value of firing amounts low is obtained besides controlling the mean inclination, the mean eccentricity, and the mean mean ground longitude for desired values by obtaining a solution to numeric search for replacing at least one of the two east-west thruster firings with firing of only one thruster based on the solution on the premise of firing of a combination of two thrusters.

The embodiments are described on the premise of a geostationary satellite. The orbit control device 9 of the embodiments is not exclusively applicable to geostationary satellite. The orbit control device 9 is applicable to, for example, quasi-zenith satellites. A quasi-zenith satellite seems to have an orbit in the shape of a figure eight elongated in the south-north direction when observed from a ground point; however, its period and altitude are the same as a geostationary satellite and its orbit plane is inclined with respect to the equatorial plane. Therefore, with proper coordinate conversions, the above-described expressions are applicable as they are.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the priority based on Japanese Patent Application No. 2015-002864, inclusive of the specification, the scope of claims, and the abstract, filed on Jan. 9, 2015, of which the disclosed contents are entirely incorporated herein by reference.

REFERENCE SIGNS LIST

1 Target value setter
2 Control amount calculator
3 Feedforward control amount calculator
4 Feedback control amount calculator
5 Distributor
6 Thruster controller
7 Satellite
8 Orbit determiner
9 Orbit control device
91, 92, 93, 94 Thruster

The invention claimed is:

1. An orbit control device for a satellite provided with four thrusters disposed on the satellite with firing directions each facing away from a mass center of the satellite, the firing directions being different from each other, the orbit control device comprising:

processing circuitry configured to
determine mean orbital elements of the satellite and temporal change rates of the mean orbital elements, the mean orbital elements including a mean inclination vector;
set target values of the mean orbital elements;
calculate control amounts of the mean orbital elements from the determined mean orbital elements, the determined temporal change rates of the mean orbital elements, and the set target values; and
calculate firing timings and firing amounts of the thrusters for realizing the calculated control amounts of the mean orbital elements by expressing a motion of the satellite with orbital elements, solving an equation taking into account coupling of an out-of-the-orbit-plane motion and an in-the-orbit-plane motion due to thruster disposition angles and thruster firing amounts at multiple times, and combining one or more calculated thruster firings controlling mainly an out-of-the-orbit-plane direction and one or more calculated thruster firings controlling mainly an in-the-orbit-plane direction; and a thruster controller to control the thrusters based on the calculated firing timings and the calculated firing amounts.

2. The orbit control device according to claim 1, wherein the processing circuitry is further configured to calculate feedback control amounts of the mean orbital elements based on the calculated mean orbital elements and the set target values of the mean orbital elements; and calculate feedforward control amounts of the mean orbital elements based on the temporal change rates of the mean orbital elements.

3. The orbit control device according to claim 1, wherein the processing circuitry is further configured to calculate the firing timings and the firing amounts of the thrusters so that the number of thrusters simultaneously used is two or less.

4. The orbit control device according to claim 1, wherein the processing circuitry is further configured to calculate a control amount of the mean inclination vector, and calculate an argument of the control amount of the mean inclination vector, determine a south-north control firing timing from the argument of the control amount of the mean inclination vector, and calculate the firing timings and the firing amounts of the thrusters so as to implement a second south-north control a ½ orbit period after a first one of the south-north control firing timing, and control a mean eccentricity vector a ¼ orbit period or a ¾ orbit period after the first one of the south-north control firing timing.

5. The orbit control device according to claim 1, wherein processing circuitry is further configured to calculate control amounts of a mean eccentric vector and the mean inclination vector, and preset a feasible timing of firing the thrusters in one orbit period, and determine the firing amounts of the thrusters for second to fourth times and whether the firing is possible based on the control amounts of the mean eccentricity vector and the mean inclination vector calculated for each timing.

6. The orbit control device according to claim 1, wherein the processing circuitry is further configured to calculate the firing timings and the firing amounts of the thrusters so as to perform south-north control one time in one orbit period using a combination of two of the thrusters and perform east-west control two times in one orbit period using a combination of two of the thrusters.

7. The orbit control device according to claim 6, wherein processing circuitry is further configured to execute a numeric search using the calculated firing timings and the calculated firing amounts of the thrusters as an initial solution, and calculate the firing timings and the firing amounts of the thrusters that eliminate use of one of the thrusters in at least one of the two east-west thruster firings.

8. A satellite, comprising:

the four thrusters disposed on the satellite with the firing directions each facing away from the mass center of the satellite, the firing directions being different from each other; and the orbit control device according to claim 1.

9. An orbit control method for a satellite comprising four thrusters disposed on the satellite with firing directions each facing away from a mass center of the satellite, the firing directions being different from each other, the orbit control method comprising:

determining mean orbital elements of the satellite and temporal change rates of the mean orbital elements, the mean orbital elements including a mean inclination vector;

setting target values of the mean orbital elements;

calculating control amounts of the mean orbital elements from the determined mean orbital elements, the determined temporal change rates of the mean orbital elements, and the set target values;

calculating firing timings and firing amounts of the thrusters for realizing the calculated control amounts of the mean orbital elements by expressing a motion of the satellite with orbital elements, solving an equation taking into account coupling of an out-of-the-orbit-plane motion and an in-the-orbit-plane motion due to thruster disposition angles and thruster firing amounts at multiple times, and combining one or more calculated thruster firings controlling mainly an out-of-the-orbit-plane direction and one or more calculated thruster firings controlling mainly an in-the-orbit-plane direction; and controlling the thrusters according to the calculated firing timings and the calculated firing amounts.

10. An orbit control device for a satellite provided with a plurality of thrusters disposed on the satellite with firing directions each facing away from a mass center of the satellite, the firing directions being different from each other, the orbit control device comprising:

processing circuitry configured to determine mean orbital elements of the satellite and temporal change rates of the mean orbital elements, the mean orbital elements including a mean inclination vector;

set target values of the mean orbital elements;

calculate control amounts of the mean orbital elements from the determined mean orbital elements, the determined temporal change rates of the mean orbital elements, and the set target values; and calculate firing timings and firing amounts of the thrusters for realizing the calculated control amounts of the mean orbital elements by expressing a motion of the satellite with orbital elements, solving an equation taking into account coupling of an out-of-the-orbit-plane motion and an in-the-orbit-plane motion due to thruster disposition angles and thruster firing amounts at multiple times, and combining one or more calculated thruster firings controlling mainly an out-of-the-orbit-plane direction and one or more calculated thruster firings controlling mainly an in-the-orbit-plane direction; and a thruster controller to control the thrusters based on the calculated firing timings and the calculated firing amounts.

11. The orbit control device according to claim 10, wherein the processing circuitry is further configured to calculate feedback control amounts of the mean orbital elements based on the calculated mean orbital elements and the set target values of the mean orbital elements; and calculate feedforward control amounts of the mean orbital elements based on the temporal change rates of the mean orbital elements.

12. The orbit control device according to claim 10, wherein the processing circuitry is further configured to calculate the firing timings and the firing amounts of the thrusters so that the number of thrusters simultaneously used is two or less.

13. The orbit control device according to claim 10, wherein the processing circuitry is further configured to
calculate a control amount of the mean inclination vector, and
calculate an argument of the control amount of the mean inclination vector, determine a south-north control firing timing from the argument of the control amount of the mean inclination vector, and calculate the firing timings and the firing amounts of the thrusters so as to implement a second south-north control a ½ orbit period after a first one of the south-north control firing timing, and control a mean eccentricity vector a ¼ orbit period or a ¾ orbit period after the first one of the south-north control firing timing.

14. The orbit control device according to claim 10, wherein the processing circuitry is further configured to
calculate control amounts of a mean eccentric vector and the mean inclination vector, and
preset a feasible timing of firing the thrusters in one orbit period, and determine the firing amounts of the thrusters for second to fourth times and whether the firing is possible based on the control amounts of the mean eccentricity vector and the mean inclination vector calculated for each timing.

15. The orbit control device according to claim 10, wherein the processing circuitry is further configured to calculate the firing timings and the firing amounts of the thrusters so as to perform south-north control one time in one orbit period using a combination of two of the thrusters and perform east-west control two times in one orbit period using a combination of two of the thrusters.

16. The orbit control device according to claim 15, wherein the processing circuitry is further configured to execute a numeric search using the calculated firing timings and the calculated firing amounts of the thrusters as an initial solution, and calculate the firing timings and the firing amounts of the thrusters that eliminate use of one of the thrusters in at least one of the two east-west thruster firings.

17. A satellite, comprising:
the plurality of thrusters disposed on the satellite with the firing directions each facing away from the mass center of the satellite, the firing directions being different from each other; and
the orbit control device according to claim 13.

* * * * *